(12) United States Patent
Aaltonen et al.

(10) Patent No.: US 6,814,949 B1
(45) Date of Patent: Nov. 9, 2004

(54) PROCESS FOR PRODUCTION OF PHOSPHORIC ACID BY CRYSTALLIZATION OF PHOSPHORIC ACID HEMIHYDRATE

(75) Inventors: Jarmo Aaltonen, Siilinjärvi (FI); Sakari Riihimäki, Vantaa (FI); Paula Ylinen, Vantaa (FI); Anders Weckman, Espoo (FI)

(73) Assignee: Kemira Chemicals Oy, Helsinki (FI)

( * ) Notice: Subject to any disclaimer, the term of this patent is extended or adjusted under 35 U.S.C. 154(b) by 0 days.

(21) Appl. No.: 09/937,317
(22) PCT Filed: Mar. 23, 2000
(86) PCT No.: PCT/FI00/00239
§ 371 (c)(1), (2), (4) Date: Nov. 14, 2001
(87) PCT Pub. No.: WO00/59827
PCT Pub. Date: Oct. 12, 2000

(30) Foreign Application Priority Data

Mar. 24, 1999 (FI) .................................. 990657

(51) Int. Cl.$^7$ .......................................... C01B 25/226
(52) U.S. Cl. ..................................................... 423/317
(58) Field of Search ............................... 423/316, 317, 423/321.1

(56) References Cited

U.S. PATENT DOCUMENTS 3,404,777 A * 10/1968 Ray et al. .................. 209/166

(List continued on next page.)

FOREIGN PATENT DOCUMENTS

DE     25 11 345      9/1975

(List continued on next page.)

OTHER PUBLICATIONS

Davister, A. et al., From Wet Crude Phosphoric Acid to High
(List continued on next page.)

Primary Examiner—Steven Bos
Assistant Examiner—Maribel Medina
(74) Attorney, Agent, or Firm—Burns, Doane, Swecker & Mathis, L.L.P.

(57) ABSTRACT

The invention relates to a process for producing simultaneously food-grade and fodder-grade phosphoric acid by crystallizing phosphoric acid hemihydrate, $H_3PO_4 \times 0.5H_2O$, from a prepurified feed acid, which is purified and crystallized with the help of the following steps, a) after the step of froth-flotation of phosphate concentrate, the concentrate is directed to a strongly magnetic separation step in order to decrease the Mg ion amount, b) the phosphate concentrate is leached in a mixture of sulfuric acid and phosphoric acid according to the wet process, the precipitated $SO_4$ and As ions are removed, and a silicon source is added in order to adjust the F/Si molar ratio to <6, c) the phosphoric acid is concentrated, the solids precipitate is removed, and the F ions are evaporated, d) the feed acid obtained from step c, having a concentration of >58% $P_2O_5$, solids concentration of <0.05%, Mg ion concentration of <1.5%, $SO_4$ ion concentration <1%, As ion concentration of <8 ppm and F ion concentration of <0.20%, is crystallized at a steady crystal growth rate of <10 μm/min, the temperature difference in the first crystallization being <17° C., and the crystals are washed with the undersaturated mother liquor of the subsequent recrystallization step, e) the phosphoric acid crystallized in step d is melted, is diluted to a concentration of <63% $P_2O_5$, seed crystals are added, and crystallization is carried out as in step d, the temperature difference being <8° C., and the crystals are washed with an undersaturated solution of phosphoric acid, and f) optionally the phosphoric acid crystallized in step e is melted, is diluted to a concentration of <63% $P_2O_5$, seed crystals are added, and crystallization is carried out as in step d, the temperature difference being <6° C., and the crystals are washed with an undersaturated washing solution prepared from product crystals.

11 Claims, 2 Drawing Sheets

U.S. PATENT DOCUMENTS

| | | | |
|---|---|---|---|
| 3,642,439 A | | 2/1972 | Moore et al. |
| 3,819,810 A | | 6/1974 | Goldstein |
| 3,912,803 A | | 10/1975 | Williams et al. |
| 4,243,643 A | | 1/1981 | Mills |
| 4,299,804 A | | 11/1981 | Parks et al. |
| 4,487,750 A | * | 12/1984 | Astley et al. ............ 423/321.1 |
| 4,657,559 A | * | 4/1987 | Mollere et al. ................ 23/297 |

FOREIGN PATENT DOCUMENTS

| | | |
|---|---|---|
| EP | 0 209 920 A1 | 1/1987 |
| FI | 95905 | 12/1995 |
| GB | 2 078 694 A | 1/1982 |
| JP | 3-193614 A | 8/1991 |
| JP | 3-237008 A | 10/1991 |
| RU | 2059570 C1 | 11/1996 |
| WO | WO 97/00714 | 1/1997 |

OTHER PUBLICATIONS

Purity Products. The Fertiliser Society of London, Oct. 15, 1981, pp. 3–19.

Becker, Pierre, Phosphates and Phosphoric Acid: Raw Materials, Technology and Economics of the West Process $H_3PO_4$. *Fertilizer Science and Technology Series*, vol. 3, pp. 427–437 Phosphate and Phosphoric Acid.

Official Journal of the European Communities, No. L 339/59, Dec. 12, 1996.

Animal Feeds: Phosphate Supplements—Purity Requirements. Chemical Economics Handbook—SRI International, Agriculture 201.8600 V, Nov. 1997.

CHEMENTATOR p. 23, Chemical Engineering, Sep. 1992.

* cited by examiner

Preparation of food-grade and fodder-grade phosphoric acid

Preparation of fertilizer-grade phosphoric acid

PROCESS FOR PRODUCTION OF PHOSPHORIC ACID BY CRYSTALLIZATION OF PHOSPHORIC ACID HEMIHYDRATE

The invention relates to a process for producing simultaneously food-grade and fodder-grade phosphoric acid by crystallizing phosphoric acid hemihydrate, $H_3PO_4 \times 0.5H_2O$, from a prepurified feed acid.

Phosphoric acid can be prepared by the wet process by allowing a mineral acid, usually sulfuric acid, to react with a calcium phosphate concentrate, whereby a dilute phosphoric acid, containing approximately 30% $P_2O_5$, and a calcium sulfate precipitate are formed. After filtration the acid contains anionic impurities of many kinds, such as sulfate and fluorine compounds, as well as cationic impurities, of which the most significant are iron, aluminum, magnesium and calcium, and organic impurities. The quantity and type of the impurities are dependent above all on the crude phosphate used as the raw material.

In a typical wet process, the sulfuric acid reacts with the calcium phosphate concentrate. When the formed gypsum is separated by filtration, there is obtained an acid containing approximately 30% $P_2O_5$, which is further concentrated to a concentration of approximately 50–55% $P_2O_5$. Most of the impurities of the phosphate concentrate remain in the phosphoric acid, and therefore this acid is used typically only as a fertilizer raw material.

Many kinds of purification processes have been developed for the purification of wet phosphoric acid in order to lower the impurity concentrations to such levels that the acid could be used for purposes even other than the preparation of fertilizers. The known purification processes include solvent extraction, precipitation by means of a solvent, indirect purification, and ion exchange methods.

The prevailing method of preparing a pure food-grade or industrial-grade phosphoric acid is to separate the impurities from a wet-process acid by extraction with an organic solvent (Davister, A., Martin, G., From wet crude phosphoric acid to high purity products, Proc. Fertilizer Soc., (1981), No. 201).

Phosphoric acid is also prepared by a thermal furnace process, wherein elemental phosphorus is prepared from crude phosphate and carbon, and the elemental phosphorus is burned to phosphorus pentoxide and is hydrolyzed to pure phosphoric acid. This process is expensive and energy-intensive.

There are also known methods for purifying phosphoric acid by crystallization. In many of these processes there is first prepared an intermediate, such as urea phosphate (DE-A-25 11 345) or aniline phosphate (WO 97/00714), which in the further reaction forms phosphoric acid and a recyclable reagent or byproduct. These processes are better suited for the preparation of phosphate salts, e.g. ammonium phosphate, than for the preparation of phosphoric acid.

For improvement of these processes there have been developed processes in which phosphoric acid itself is crystallized, either as hemihydrate, $H_3PO_4 \times 0.5H_2O$, (EP-B1 0 209 920) or in anhydrous form, $H_3PO_4$ (GP-A 2 078 694). In these processes the purification result has not been very good, or a very strong acid (68% $P_2O_5$) has been required. A Russian patent (RU-C1-2059570) discloses a crystallization process in which a sufficiently pure food-grade phosphoric acid is obtained only through four crystallizations. There are also known processes (JP application 3-237008 and JP application 3-193614) in which an electronics-grade acid is prepared by phosphoric acid crystallization from a food-grade phosphoric acid.

Fodder-grade phosphoric acid is commonly prepared from a wet-process acid by precipitating by various precipitation processes the ions detrimental in terms of the targeted use and by separating the precipitates from the acid. When necessary, the acid is concentrated to the desired concentration.

In extraction or crystallization processes there is required a pretreatment removing solids and ions poorly removable in the process. There is often the problem of a separate process step and an impurity-containing side stream for which it is necessary to find some targeted disposal.

From the literature there are known a number of processes by which individual ions (e.g. As, $SO_4$) are precipitated from phosphoric acid.

There are many methods for removing magnesium from phosphoric acid (FI patent 95905, U.S. Pat. No. 3,642,439, U.S. Pat. No. 4,299,804, U.S. Pat. No. 4,243,643 and U.S. Pat. No. 3,819,810). The methods require separate processes and in general produce a byproduct. It has also been proposed that magnesium be removed from a concentrate by, for example, preliminary leaching (Chemical Engineering, September 1992, p. 23). In this case, also, a separate multiple-step process is required. According to Becker (Pierre Becker, Phosphates and Phosphoric acid, Raw Materials, Technology and Economics of the Wet Process, 1983, p. 432), however, there is no easy and economical method for removing magnesium from phosphoric acid.

There are a number of problems involved in the preparation of purified phosphoric acids. The thermal process has the disadvantages of a high energy consumption and additional equipment for preventing detrimental environmental emissions. The extraction requires a large unit in order for the complicated process to be profitable. Many new processes have had problems in achieving a sufficiently high quality.

The purification processes typically produce problematic side streams containing large quantities of impurities, and these streams need to be treated separately to produce byproducts or be taken to a dump.

In processes using a recyclable extraction or precipitation chemical the spent reagent regularly needs to be replaced with fresh chemical. In addition, there is always the possibility that toxic or otherwise detrimental residues are left in the product from the chemical.

In phosphoric acid crystallization processes, the purification has required several steps (4–5) for the achievement of the food grade. Crystallizations of anhydrous phosphoric acid, $H_3PO_4$, have additionally had the disadvantage of the high concentration (>68% $P_2O_5$) required of the feed, which strongly increases the viscosity of the impurity-containing acid.

The object of the present invention is to provide a novel process wherein, through a development of the wet process, there is produced a sufficiently pure strong phosphoric acid, from which there are obtained both a food-grade phosphoric acid and a phosphoric acid suitable for the production of animal fodders.

The above-mentioned objects of the invention have now been achieved by a process of a novel type, which includes a pretreatment step wherein the magnesium, arsenic and sulfate are adjusted to levels suitable for the end products. If the impurity levels, for example, the levels of Mg and As ions, are already sufficiently low, the pretreatment with respect to these can be omitted. The magnesium level is preferably adjusted in connection with the concentrating. The arsenic and sulfate levels are adjusted in connection with the wet process. In the concentration, the fluorine evaporates to the necessary level when the acid is sufficiently pure and the molar proportion F/Si<6. Before the acid is fed to the phosphoric acid crystallization, the gypsum precipitated from it in the treatment is removed; this improves both the working of the crystallization and the quality of fodder-grade acid.

The final product acids are obtained by crystallization by a phosphoric acid hemihydrate process, and the product recrystallized therein is suitable for use in food and the mother liquor of the process is suitable for use in animal fodder.

The main characteristics of the process according to the invention are given in accompanying claims 1–10.

Thus, according to the invention, there is provided a process for producing food-grade phosphoric acid by crystallizing phosphoric acid hemihydrate, $H_3PO_4 \times 0.5H_2O$, from a prepurified feed acid, in which process the feed acid used for the crystallization is purified with the help of the following steps, a) after the step of froth-flotation of phosphate concentrate, the concentrate is directed to a strongly magnetic separation step in order to decrease the concentration of Mg ions, b) the phosphate concentrate is leached in a mixture of sulfuric acid and phosphoric acid according to the wet process, the precipitated $SO_4$ and As ions are removed, and a silicon source is added in order to adjust the F/Si molar ratio to <6, c) the phosphoric acid is concentrated, the solids precipitate is removed, and the F ions are evaporated, d) the feed acid obtained from step c, having a concentration of >58% $P_2O_5$, solids concentration of <0.05%, Mg ion concentration of <1.5%, $SO_4$ ion concentration of <1%, As ion concentration of <8 ppm and F ion concentration of <0.2%, is crystallized at a steady crystal growth rate of <10 $\mu$m/min, corresponding to <25 wt % crystals/hour, when seed crystals are added in an amount of at maximum 2% as a 40% crystal slurry having a Fe ion concentration of <500 ppm and a seed crystal size of <200 $\mu$m, the temperature difference in the first crystallization being <17° C., and the crystals are washed with the undersaturated mother liquor of the subsequent recrystallization step, e) the phosphoric acid crystallized in step d is melted, is diluted to a concentration of <63% $P_2O_5$, seed crystals are added, and crystallization is carried out as in step d, the temperature difference being <8° C., and the crystals are washed with an undersaturated solution of phosphoric acid, and f) optionally the phosphoric acid crystallized in step e is melted, is diluted to a concentration of <63% $P_2O_5$, seed crystals are added, and crystallization is carried out as in step d, the temperature difference being <6° C., and the crystals are washed with an undersaturated washing solution prepared from product crystals.

In the phosphate chain, which begins at the mine and ends in phosphoric acid products, there are made such changes that, instead of a fertilizer-grade phosphoric acid there are obtained two streams, the purer one of them being suitable for food-grade phosphoric acid (Official Journal of the European Communities, No. L339/59–60, (20 Dec. 1996) E338 Phosphoric Acid) and the one obtained as the mother liquor fulfilling requirements set on animal fodder phosphates (Chemical Economics Handbook, SRI International, November 1997; Animal Feeds, Phosphate Supplements). The acids can, of course, also be used for the preparation of other products, e.g. detergent phosphates. The crystallization process produces no waste; all of the material fed in can be converted to products of a higher added value.

In the production chain according to the invention it is advantageous to remove the magnesium in order to facilitate the concentration of the phosphoric acid and the removal of fluorine, and in order to prevent magnesium phosphate from being precipitated (FI patent 95905) during the phosphoric acid crystallization.

Even though it is possible to exploit concentrates containing even more than 2% MgO, it is technically and economically advantageous if the concentrate contains <1.2% MgO. Instead of removing magnesium from the phosphoric acid in a separate process, the phosphate concentration has been made more effective so that the quality obtained is high enough for the further process. It is typical of froth-flotation processes that phosphoric yield is lost to an increasing degree at the final stage of purification.

It has thus been realized that by adding a strongly magnetic separator at the end of the froth-flotation cycle, a high concentrate quality and a high yield are obtained. The concentration of phosphate by froth-flotation can be left within a range where the yield is still good, and the required purity is achieved by magnetic separation. The efficiency of the separation is typically optimized by means of the strength of the magnetic field, by flow rates, and by adapting the matrix permeation to one suited for the particle size distribution of the feed. Losses of phosphorus can be minimized by suitable adjustment of the washes.

According to the invention, a magnetic flux density of at minimum 1 Tesla, preferably 1–3 Tesla, is used in the magnetic separation.

The other advantages of magnetic separation include simplicity of the process, small investment, and low operating expenses. In magnetic separation, no waste stream difficult to dispose of is formed, and the separated minerals are in their original form and are thus suitable for being combined with the concentrate sand leaving the froth-flotation process. Other impurities (e.g. Fe, Al) are also removed in the treatment in addition to magnesium. Typically the concentrate contains after the treatments approximately 37% $P_2O_5$ and <0.8% MgO.

In the preparation of phosphoric acid, apatite concentrate is leached in accordance with the wet process in a mixture of sulfuric acid and phosphoric acid, and the formed gypsum is separated. The formed acid has a concentration of approximately 28% $P_2O_5$. A purer concentrate at this stage yields a purer acid, which is easier to filter.

Next, the phosphoric acid is concentrated. Calcium (for example, in the form of apatite) is added to an acid which contains approximately 40% $P_2O_5$, the calcium precipitating the sulfate to gypsum. The sulfate is removed in order that the acid should be easier to concentrate and that there should remain no sulfate as filler in the animal fodder acid. The disposal of the separated gypsum is not a problem, since in the wet process gypsum is formed even otherwise. Sulfide, for example, as sodium sulfide, is dosed according to need to adjust the arsenic level in the acid to the desired level. Also other heavy metals, e.g. copper, may be precipitated at the same time.

The acid obtained from the preceding step is concentrated, and the precipitate, which contains mainly gypsum, is separated from the hot acid (60–80° C.) by centrifugation and/or filtration. After this step the concentration of the acid is approximately 58–60% $P_2O_5$, its solids content <0.05%, and fluorine content <0.18% F.

The obtained acid is used as feed to the phosphoric acid crystallization step. First the acid is cooled by means of a heat exchanger to a temperature suitable for crystallization. The cooling liquid used may be water and/or cold mother liquor leaving the crystallization process. In winter it may be preferable to heat the mother liquor to prevent undercooling, for example, during transport The cooled acid, which is saturated with respect to phosphoric acid hemihydrate, $H_3PO_4 \times 0.5H_2O$, is fed into the crystallizer. The crystallization is carried out by adding seed crystals approximately 2% and by cooling at a suitable rate until a sufficient quantity of crystals (30–50%) has formed. The obtained crystals are melted and recrystallized at least once, typically twice.

In order that the crystallization process should function technically well and that the purification of the acid should be sufficient, the conditions have to be within certain precise limits. The most significant inventive factors associated with the crystallization step of the process according to the invention are:

Elements isomorphous with phosphorus (e.g. As, Cr, V) and ions strongly complexing with phosphoric acid (e.g. Fe) are incorporated into the crystals unless the crystallization rate is sufficiently low. A sufficient residence time (approximately 2 h) is required in order not to exceed the critical growth rate, which is also maintained constant in batch crystallization. When the seed crystals are typically <100 μm in size and the typical crystal size of the crystal product is approximately 0.7 mm, the mean crystal growth rate obtained with a residence time of two hours is approximately 5 μm/min.

In order that crystallizations on the walls should be avoided, the temperature differences between the crystal slurry and the coolant in the 1st, 2nd and 3rd crystallization steps must not exceed 17° C., 8° C. and 6° C. Furthermore, it is advantageous if the temperature difference at the beginning of the crystallization is smaller, since the growth surface area is not yet sufficient.

An important point in the crystallization steps in the process according to the invention is to pay special attention to the washing. The mother liquor of the subsequent crystallization step is used for the washing. The saturation degree is set at somewhat undersaturated by allowing a saturated mother liquor to heat up approximately 5° C. In the last step, a washing solution is used which has been prepared from product crystals and has respectively been adjusted at unsaturated. Since the washing acids can be recycled to the process as a feed, it is always possible to wash with a sufficient quantity in order for the impure mother liquor present in the crystal cake to be removed as well as possible. A typical amount is approximately 1.5 times the amount of mother liquor in the cake, which is typically approximately 10–30% of the weight of the cake. High viscosities (>2000 cP) of the crystal slurries worsen the washing result, since the crystals begin to adhere to one another (agglomerate), in which case they enclose inside themselves mother liquor, which cannot be removed by washing.

Seed crystals are prepared from a phosphoric acid containing over 60% $P_2O_5$ and <500 ppm Fe. A higher iron content than this in the seed crystal acid significantly lowers the quality of the forming product crystals. The produced seed crystal slurry, which contains approximately 30–40% crystals having a crystal size of <200 μM is used in an amount of approximately 3–5% of the amount of the feed to the crystallization. Thus actual seed crystals are used in an amount of approximately 1–2%. Product crystals or their pieces are thus not suitable for seed, since their surfaces are probably contaminated. Only in those crystallization steps, in which the feed is at least as pure as the crystal seed (e.g. the 3$^{rd}$ crystallization), may spontaneous nucleation also be allowed to occur.

The most suitable conditions for the crystallization steps of the process according to the invention are compiled in Table 1.

TABLE 1

Preferred conditions for the crystallizations

| | 1$^{st}$ crystallization | 2$^{nd}$ crystallization | 3$^{rd}$ crystallization |
|---|---|---|---|
| Feed concentration, $P_2O_5$ % | 58–61 | 60–63 | 60–63 |
| Slurry/coolant temperature difference, ° C. | <17 | <8 | <6 |
| Residence time, h | 1.5–3 | 1.5–3 | 1.5–3 |
| Crystal percentage | 25–40 | 35–50 | 30–45 |
| Seed slurry amount, % of feed | 3–4 | 3–4 | 3–4 |
| Crystal growth rate, μm/min | 4–8 | 5–10 | 5–10 |

Figure 1:
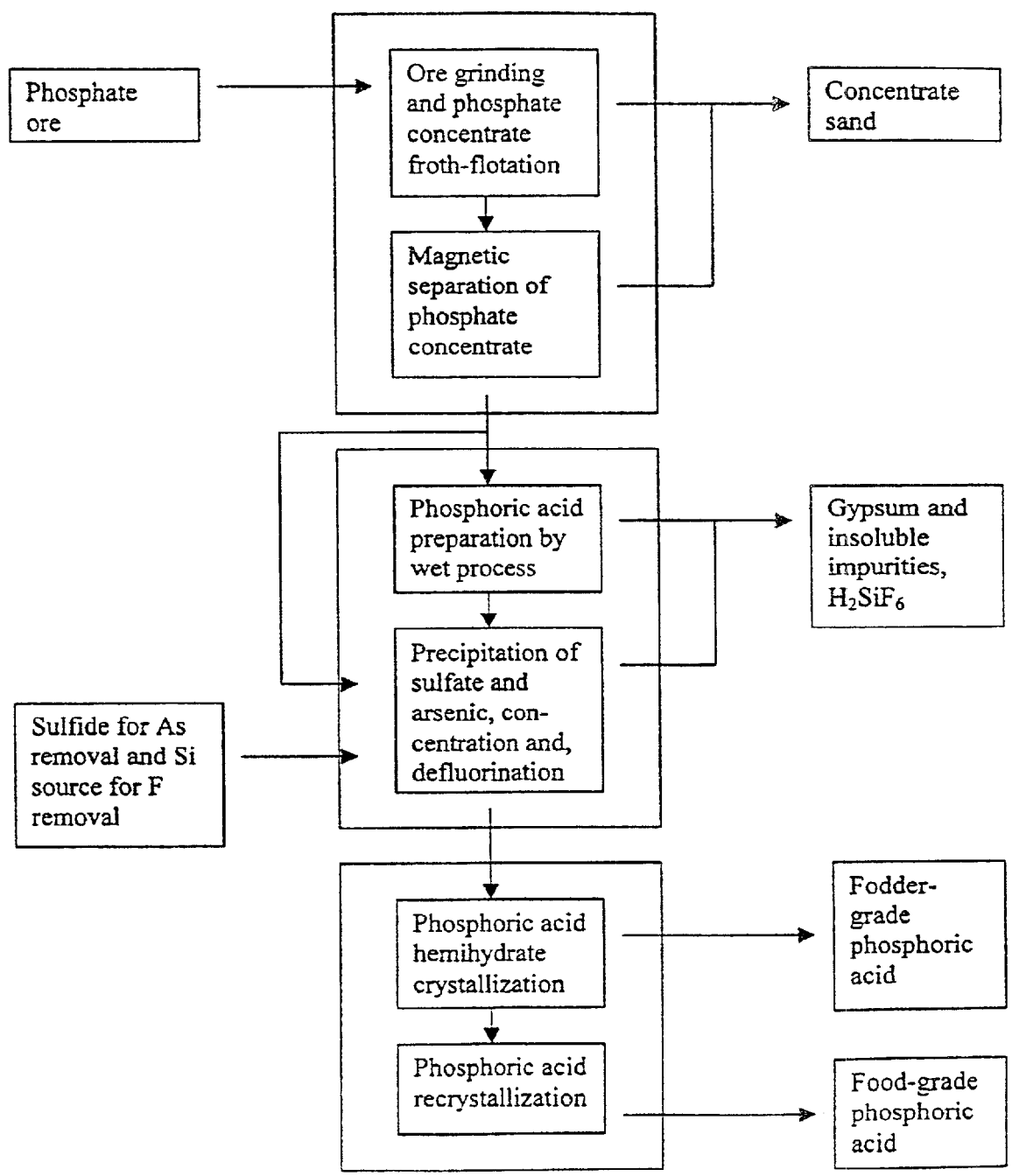
FIG. 1 depicts a diagram of the process according to the invention for the preparation of food-grade and fodder-grade phosphoric acid.
Figure 2:
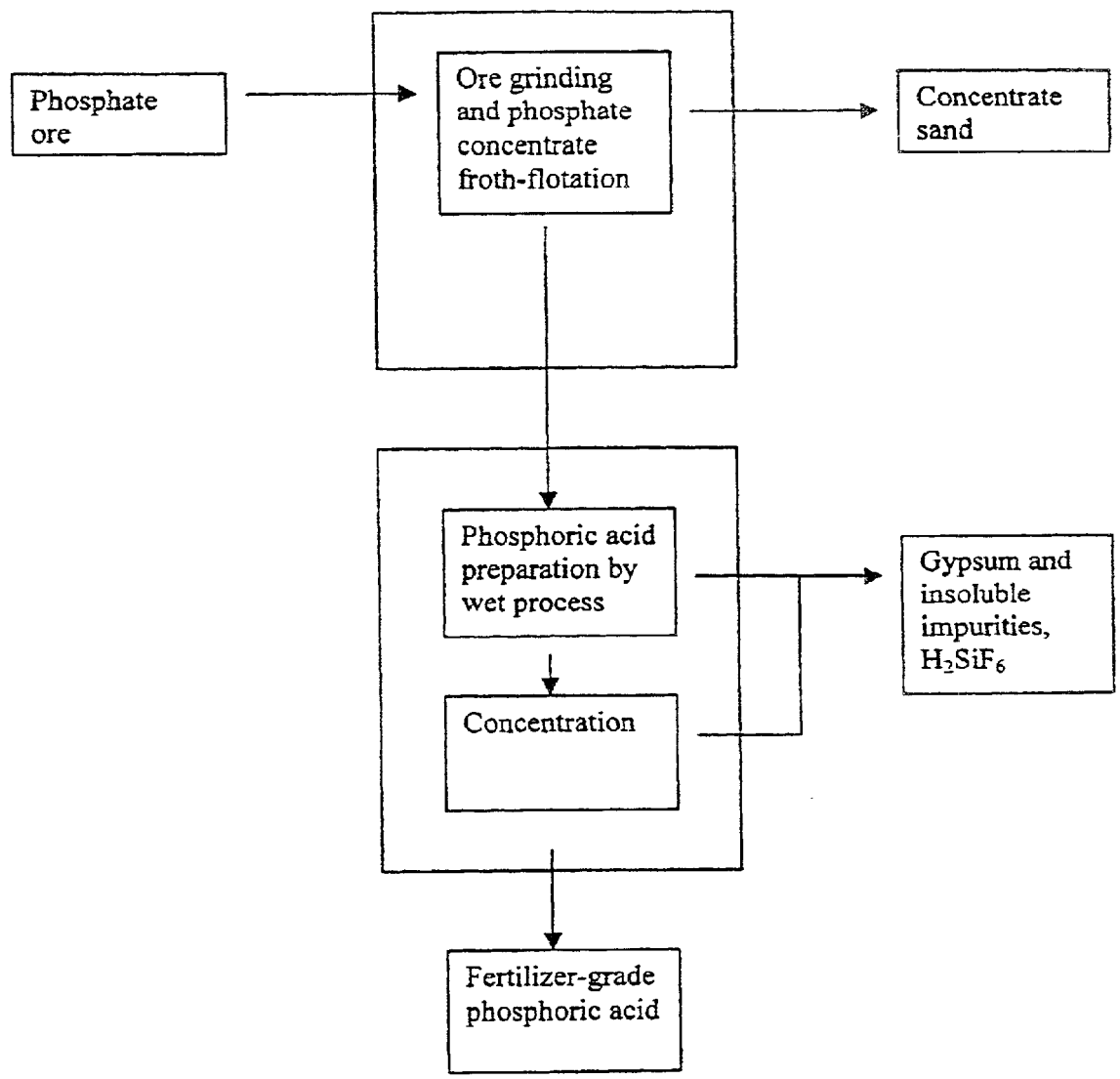
FIG. 2 depicts a reference diagram for the preparation of fertilizer-grade phosphoric acid.

The process according to the invention for the preparation of food-grade and fodder-grade phosphoric acid has the following advantages over other processes:

No waste difficult to dispose of is produced in the production chain; the concentrate sand coming from the magnetic separation and the gypsum to be separated can be combined with the normal streams of the production chain.

In the crystallization all of the impurities (cations, anions, organics, color) are separated at the same time, and thus no separate process steps are required for the separation of certain ions.

The quality of the food-grade acid obtained by this process is in many respects (in particular heavy metals and organics) clearly higher than the quality of corresponding acids on the market The investment is small since a significant portion of the equipment required is already in existence (e.g. concentration units). The additional equipment is easy to place in connection with the existing plant The production does not require any circulating additional chemicals requiring separate treatment (e.g. organic leaching or precipitation chemicals), the efficacy of which chemicals decreases with time and they have to be replaced.

Energy consumption in the process is low, since the exiting cold mother liquor cools the feed entering crystallization. Since the heat released in the forming of crystals in the crystallization is equal to the heat required for melting them, these streams also compensate one another.

The operating costs of the process are low, since magnetic separation on a large scale consumes almost as little energy as on a small scale.

In the rest of the pretreatment, substances naturally belonging to the process (apatite, silicate) or economical waste streams (sodium sulfide) are used.

No waste requiring separate treatment is formed in the crystallization.

A very small number of operating personnel is needed, since the partial factors of the process (magnetic separation, crystallization, filtration, melting) are all known and reliable.

Owing to its small investment need and low operating costs, the preparation of food-grade acid implemented with an integrated process such as this is profitable on a much smaller scale than, for example, when implemented with the prevailing extraction technique.

It is suitable for integrated production in which several product grades are prepared only by adjusting the process capacity, the number of recrystallizations, or by taking acid from different intermediate stages.

The process is also a concentration process in which all concentrations <66% $P_2O_5$ are possible.

Owing to the improved purification efficiency the yield of the crystallization process is higher or, respectively, the quality is better than in processes previously disclosed in the literature.

The process can be run either as a batch process or in a continuous-working manner.

In terms of the economy it is important that the losses of phosphorus should be minimal and at as early a stage of the production chain as possible. Therefore it is preferable to remove impurities already in the concentration step in the form of natural stable minerals instead of precipitating the impurities as compounds which may even have to be taken to a dump. In the phosphoric acid crystallization process the product yield is 100%, since both of the streams leaving the process are products.

The percentages in the present description and the accompanying claims are percentages by weight, unless otherwise indicated.

EXAMPLE 1

A phosphate concentrate in the form of a slurry having a solids content of approximately 30% was fed into a strongly magnetic separator. The strength of the magnetic field was 1.7 Tesla. The types and amounts of the feed and the product are shown in Table 2.

TABLE 2

|  | Phosphate concentrate to magnetic separation | Purified phosphate from magnetic separation | Yield into the product |
|---|---|---|---|
| Mass % |  |  | 95.0 |
| $P_2O_5$, % | 36.1 | 37.5 | 98.4 |
| $K_2O$, % | 0.14 | 0.10 | 66.9 |
| MgO, % | 1.26 | 0.62 | 46.8 |
| $Na_2O$, % | 0.31 | 0.30 | 93.2 |
| $SiO_2$, % | 1.93 | 0.90 | 44.1 |
| $Fe_2O_3$, % | 0.6 | 0.3 | 45.6 |
| $Al_2O_3$, % | 0.3 | 0.2 | 59.2 |
| CaO, % | 49.9 | 51.0 | 96.9 |
| $CO_2$, % | 4.7 | 4.1 | 82.6 |

EXAMPLE 2

A phosphate concentrate originating in another ore deposit, containing 37.5% $P_2O_5$ and 1.83% MgO, was treated in the form of a 25% slurry in a magnetic field of 2.0 Tesla. The phosphorus yield was 95.3% into the purified product, which contained 38.4% $P_2O_5$ and 1.0% MgO. The magnetic byproduct contained 23.7% $P_2O_5$ and 11.7% MgO.

EXAMPLE 3

A wet-process phosphoric acid (27% $P_2O_5$) was concentrated to a concentration of 40% $P_2O_5$. Phosphate concentrate was added in an amount of 1% to precipitate the sulfate as gypsum with a 1 hour residence at 50° C. The molar ratio F/Si in the phosphoric acid was adjusted to <6 by adding a soluble silicon source. The precipitated gypsum was filtered before concentration to >58% $P_2O_5$. The phosphoric acid was concentrated and the solids formed during the concentration were separated. The acid prepared in this manner contained 58.5% $P_2O_5$, 0.15% F, and <0.05% solids.

EXAMPLE 4

A phosphoric acid which had been pretreated according to Examples 1 and 3 was crystallized in a 110-liter continuous-working crystallizer with a 1.8 hour residence time, and was recrystallized with residence times of 1.7 and 2.2 hours. In each step, approximately 4% seed crystal slurry was used (<20 ppm Fe). The total yield of the process was approximately 30%. Table 3 shows analyses of the formed intermediate and final products.

TABLE 3

|  | Feed acid | First crystal product | Second crystal product | Third crystal product | Process mother liquor |
|---|---|---|---|---|---|
| $P_2O_5$, % | 61 | 64.2 | 64.7 | 64.6 | 58.4 |
| As, ppm | 0.3 | 0.1 | <0.1 | <0.1 | 0.4 |
| F, ppm | 1700 | 80 | 10 | <10 | 2000 |
| Cl, ppm | <10 | <10 | <10 | <10 | <10 |
| $NO_3$, ppm | 6 | <5 | <5 | <5 | 9 |
| $SO_4$, ppm | 3000 | 192 | 36 | 30 | 4200 |
| Al, ppm | 1200 | 100 | 11 | 2 | 1700 |
| Ca, ppm | 300 | 27 | 3 | <2 | 460 |
| Cr, ppm | 3 | 0.5 | <0.3 | <0.3 | 3.7 |
| Cu, ppm | 0.7 | <0.4 | <0.2 | <0.2 | 1.1 |
| Fe, ppm | 4500 | 600 | 70 | 16.6 | 5700 |
| Mg, ppm | 7000 | 450 | 47 | 8 | 10300 |
| Mn, ppm | 500 | 44 | 4 | <2 | 720 |
| Ni, ppm | 4 | 0.3 | <0.2 | <0.2 | 5.7 |
| Cd, ppm | 0.3 | <0.1 | <0.1 | <0.1 | 0.5 |
| V, ppm | 10 | 2.5 | 0.3 | <0.2 | 13.5 |
| Solids, % | <0.05 |  |  |  |  |

EXAMPLE 5

Phosphoric acid which had been pretreated in accordance with Examples 1 and 3 was crystallized in a 110-liter continuous-working crystallizer with a 2.7 hour residence time and was recrystallized twice, with residence times of 1.1 and 2.2 hours. The total yield of the process was approximately 25%. In each step, approximately 4% seed crystal slurry (<20 ppm Fe) was used. The pure product acid was diluted with water to a final concentration of 55.8% $P_2O_5$. Table 4 shows analyses of the feed acid and the final products.

TABLE 4

|  | Feed acid | Pure product acid | Process mother liquor |
|---|---|---|---|
| $P_2O_5$, % | 58 | 55.8 | 55.5 |
| As, ppm | 0.3 | <0.1 | <0.2 |
| F, ppm | 1500 | 3 | 0.21 |
| HM, ppm* |  | <10 |  |
| Cl, ppm | 8 | <10 | <10 |
| $NO_3$, ppm | <5 | <5 | 13 |
| $SO_4$, ppm | 4200 | 30 | 5400 |
| Al, ppm | 1500 | 5 | 1800 |
| Ca, ppm | 240 | <2 | 310 |
| Cr, ppm | 3.3 | <0.3 | 3.6 |
| Cu, ppm | <0.4 | <0.2 | <0.4 |
| Fe, ppm | 4000 | 17.1 | 5000 |
| Mg, ppm | 7900 | 9 | 9800 |
| Mn, ppm | 570 | <2 | 710 |
| Ni, ppm | 4.3 | <0.2 | 5.8 |
| Zn, ppm |  | 0.93 |  |
| Pb, ppm |  | <0.1 |  |
| Cd, ppm | 0.3 | <0.1 | 0.4 |
| Hg, ppm | <0.01 |  |  |
| V, ppm | 11.4 | <0.2 | 14.3 |
| Volatile acids, µequiv/g |  | 0.024 |  |
| Solids, % | <0.05 |  |  |

*sum of heavy metals in accordance with Food Chemicals Codex (1997, USA)

EXAMPLE 6

Phosphoric acid was crystallized as a batch in a 0.6 m³ tank crystallizer for 2 hours. Seed crystal slurry was used in an amount of 3% (250 ppm Fe). The temperature difference between the crystal slurry and the coolant liquid was initially 4° C. and at the end 8° C., following the curve for steady crystal growth. The crystal amount was 41% and the crystal size was approximately 1 mm.

In recrystallization the residence time was in the first case 5 hours, seed crystal slurry being used ill an amount of 3% and the temperature difference being maintained constant (6° C.). The crystal size was approximately 1 mm. In the second case the residence time was three hours and the temperature followed the curve for steady crystal growth (2 ... 6° C.). In both cases the crystal amount was 31%, and the crystals were separated with a centrifuge and for the washing of the crystals a washing solution was used in an amount of 12.5% of the crystal amount. The total yield of the process was approximately 35%. Table 5 shows the conditions of the batch crystallizations.

TABLE 6

Phosphoric acid crystallization of Moroccan acid

| | Concentrated and filtered Moroccan acid | Product of phosphoric acid crystallization | Purification ratio Feed/product |
|---|---|---|---|
| $P_2O_5$, % | 64 | 65.1 | |
| F, % | 0.13 | 0.026 | 5 |
| $SO_4$, % | 0.9 | 0.33 | 2.7 |
| Mg, % | 0.44 | 0.089 | 4.9 |
| Fe, % | 0.39 | 0.09 | 4.3 |
| Ca, % | 0.21 | 0.11 | 2 |
| Al, % | 0.22 | 0.041 | 5.4 |
| Mn, ppm | 13 | 6 | 2.2 |
| Zn, ppm | 330 | 100 | 3.3 |
| Cr, ppm | 420 | 110 | 3.8 |
| Cd, ppm | 10 | 3.9 | 2.6 |
| As, ppm | 13 | 3.9 | 3.4 |
| Cu, ppm | 34 | 8 | 4.3 |
| Pb, ppm | <0.2 | <0.2 | — |

TABLE 5

Preparation of food-grade acid by batch crystallization in two steps

| | 1st crystal-lization | 2nd crystal-lization Case 1 | 2nd crystal-lization Case 2 | 1st crystal-lization feed | 1st crystal-lization product | 2nd crystal-lization feed Case 1 | 2nd crystal-lization product Case 1 | 2nd crystal-lization feed Case 2 | 2nd crystal-lization product Case 2 |
|---|---|---|---|---|---|---|---|---|---|
| Residence time, h | 2 | 5 | 3 | | | | | | |
| Seed slurry | 3 | 3 | 3 | | | | | | |
| Temperature difference | 4 ... 8 | 6 | 2 ... 6 | | | | | | |
| $P_2O_5$, % | | | | 60.8 | 65.9 | 62.1 | 65.7 | 62.2 | 66.5 |
| Fe, ppm | | | | 4300 | 230 | 230 | 19 | 150 | 7 |
| F, ppm | | | | 1600 | 42 | 36 | <10 | 13 | <10 |
| Solids, % | 41 | 31 | 31 | <0.05 | — | | — | | |
| Density, g/dm³ | 1750 | | | 1721 | 1710 | | 1678 | | 1692 |
| Viscosity, cP | 350 | 158 | 145 | 75 | | 67 | | 84 | |
| Temperature | | 7.1 | | 16.6 | 57 | | 41 | | 24 |

EXAMPLE 7

The magnesium content of a phosphoric acid originating in Morocco was decreased by concentration and crystallization of magnesium phosphate in accordance with FI patent 95905. The purified acid was diluted with water to 62.9% $P_2O_5$, was crystallized once by adding, in an amount of 6%, a seed crystal slurry (<20 ppm Fe) made from pure phosphoric acid. During crystallization, a cooling was carried out from 23° C. to 7° C. in five hours. The temperature difference between the crystal slurry and the coolant was 7° C. The viscosity of the crystal slurry was 7500 cP, the crystals were separated in a centrifuge, and the crystal product yield was 55%. The example deviates from the optimum conditions as regards to prepurification, precipitation, feed acid concentration, seed crystal amount and viscosity, in which case the purification is also poorer than in the other examples. The purification in the phosphoric acid crystallization is shown in Table 6.

What is claimed is:

1. A process for the production of food-grade phosphoric acid by crystallization of phosphoric acid hemihydrate, $H_3PO_4 \times 0.5H_2O$, from a prepurified feed acid, comprising:
    purifying the feed acid used for crystallization by the following steps a, b and c:
    a) after a froth-flotation step of a phosphate concentrate, the concentrate is directed to a strongly magnetic separation step for the decreasing of an Mg ion amount,
    b) the phosphate concentrate is leached in a mixture of sulfuric acid and phosphoric acid according to a wet process, precipitated $SO_4$ and As ions are removed, and a source of silicon is added in order to adjust an F/Si molar ratio to <6,
    c) the phosphoric acid is concentrated, a solids precipitate is removed and F ions are evaporated, and
    d) the feed acid obtained from step c, having a concentration of >58 wt. % $P_2O_5$, a solids concentration of <0.05 wt. %, an Mg ion concentration of <1.5 wt. %, an $SO_4$ ion concentration of <1 wt. %, an As ion concentration of <8 ppm, and an F ion concentration of <0.2 wt. %, is crystallized at a steady crystal growth rate of <10 μm/min, corresponding to <25 wt. % crystals/hour, when seed crystals are added in an amount of at maximum 2 wt. % in the form of a 40 wt. % crystal slurry, in which an Fe ion concentration is <500 ppm and seed crystal size is <200 μm, the temperature difference in a first crystallization being <17° C., and the crystals are washed with an undersaturated mother liquor of a subsequent recrystallization step, e) the phosphoric acid crystallized in step d is melted, diluted to a concentration of <63 wt. % $P_2O_5$, seed crystals are added, and crystallization is carried out as in step d, the temperature difference being <8° C., and the crystals are washed with an undersaturated solution of phosphoric acid, and f) optionally the phosphoric acid crystallized in step e is melted, diluted to a concentration of <63 wt. % $P_2O_5$, seed crystals are added, and crystallization is carried out as in step d, the temperature difference being <6° C., and the crystals are washed with an undersaturated washing solution prepared from product crystals.

2. A process according to claim 1, wherein the process comprises one recrystallization step e.

3. A process according to claim 1, wherein the process comprises two recrystallization steps e and f, the crystals of step e being washed with an undersaturated mother liquor obtained from the subsequent recrystallization step f.

4. A process according to claim 1, wherein the mother liquor of the first crystallization step d is separated as a fodder-grade phosphoric acid.

5. A process according to claim 1, wherein the acid crystallized in steps e and/or f is melted and diluted to food-grade phosphoric acid.

6. A process according to claim 1, wherein the crystallization step of the process is implemented as a batch process or a continuous-working process.

7. A process according to claim 1, wherein the mother liquors of recrystallization steps e and/or f are recycled as feed acid to the same and/or preceding step.

8. A process according to claim 1, wherein a magnetic flux density of at minimum 1 Tesla is used in step a.

9. A process according to claim 1, wherein in the crystallization steps of the process the viscosity of the crystal slurry is <2000 cP.

10. A process according to claim 1, wherein in crystallization step d the concentration of the feed acid is <61 wt. % $P_2O_5$, the Mg ion concentration is <1.2 wt. % Mg, and the F ion concentration is <0.18 wt. %.

11. A process according to claim 8, wherein a magnetic flux density of 1–3 Tesla is used in step a.

* * * * *